(12) United States Patent
Wenxiu et al.

(10) Patent No.: US 9,235,879 B2
(45) Date of Patent: Jan. 12, 2016

(54) APPARATUS, SYSTEM, AND METHOD FOR TEMPORAL DOMAIN HOLE FILLING BASED ON BACKGROUND MODELING FOR VIEW SYNTHESIS

(75) Inventors: Sun Wenxiu, Wong Tai Sin (HK); Oscar C. Au, Clear Water Bay (HK); Lingfeng Xu, Clear Water Bay (HK); Yujun Li, Kowloon (HK); Wei Hu, Clear Water Bay (HK); Lu Wang, Shenzhen (CN)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 554 days.

(21) Appl. No.: 13/538,966

(22) Filed: Jun. 29, 2012

(65) Prior Publication Data

US 2014/0002591 A1 Jan. 2, 2014

(51) Int. Cl.
*G06T 5/00* (2006.01)
*H04N 13/02* (2006.01)

(52) U.S. Cl.
CPC ....... *G06T 5/005* (2013.01); *G06T 2207/10021* (2013.01); *G06T 2207/20182* (2013.01); *H04N 13/026* (2013.01)

(58) Field of Classification Search
CPC ...................................... G06T 5/005
USPC .......................................... 348/42
See application file for complete search history.

(56) References Cited

U.S. PATENT DOCUMENTS

| | | | |
|---|---|---|---|
| 6,661,918 B1 * | 12/2003 | Gordon et al. | 382/173 |
| 7,317,830 B1 | 1/2008 | Gordon et al. | |
| 2006/0045335 A1 * | 3/2006 | Toyama et al. | 382/171 |
| 2008/0226172 A1 * | 9/2008 | Connell | 382/181 |
| 2013/0084006 A1 * | 4/2013 | Zhang et al. | 382/173 |
| 2013/0127844 A1 * | 5/2013 | Koeppel et al. | 345/419 |
| 2013/0136299 A1 * | 5/2013 | Kim et al. | 382/103 |

OTHER PUBLICATIONS

Sun et al., Novel Temporal Domain Hole Filling Based on Background Modeling for View Synthesis, Department of Electronic and Computer Engineering, The Hong Kong University of Science and Technology, 4 pp.
Criminisi et al., "Efficient Dense Stereo with Occlusions for New View-Synthesis by Foure-State Dynmaic Programming," HTTP://Research.Microsoft.com/Vision/Cambridge/I2I, Kluwer Academic Publishers, Bostion, Manufactured in the Netherlands, pp. 1-23.
Huang, et al., "A Layered Method of Visibility Resolving in Depth Image-based Rendering," Thomas Corporate Research, Princeton, NJ, State Key Lab of Machine Perception, Peking University, Beijing, 978-1-4244-2175-6/08, 2008; 4 pps.

(Continued)

*Primary Examiner* — Sath V Perungavoor
*Assistant Examiner* — Jeffery Williams
(74) *Attorney, Agent, or Firm* — Norton Rose Fulbright US LLP

(57) ABSTRACT

Embodiments of apparatuses, systems, and methods for a temporal hole filling are described. Specifically, an embodiment of the present invention may include a depth-based hole filling process that includes a background modeling technique (SGM). Beneficially, in such an embodiment, holes in the synthesized view may be filled effectively and efficiently.

18 Claims, 8 Drawing Sheets

(56) References Cited

OTHER PUBLICATIONS

Harville et al., "Adaptive Video Background Modeling Using Color and Depth," 0-7803-6725-1/01 2001 IEEE; pp. 90-93.

Gordon et al., "Background Estimation and Removal Based on Range and Color," Inverval Research Corp.; In Proceedings of the IEEE Computer Society Conference on Computer Vision and Pattern Recognition, (Fort Collins, CO), Jun. 1999; 1999 IEEE; pp. 1-6.

* cited by examiner

*Spatial*

**Temporal:
past frames**

**Temporal:
past frames**

**Temporal:
future frames**

APPARATUS, SYSTEM, AND METHOD FOR TEMPORAL DOMAIN HOLE FILLING BASED ON BACKGROUND MODELING FOR VIEW SYNTHESIS

CROSS-REFERENCE TO RELATED APPLICATIONS

The present invention relates generally to image processing and, more particularly, to apparatuses, systems, and methods for temporal domain hole filling based on background modeling for view synthesis.

TECHNICAL FIELD

View synthesis technique aims to create new views from the existing single or multiple views. Typical applications include free-viewpoint video (FTV), 3DTV and 2D-3D conversion, etc. Based on the popular 3D representation using depth map plus texture image, view synthesis is achievable through 3D warping technique. However, 3D warping is not able to project pixels to disoccluded regions, because these regions only emerge from the virtual viewpoint. For example, as illustrated in FIG. 1, disoccluded regions 110 may occur in areas where nearer objects 104 obscure further objects 106 from a reference view 102, but those obstructions are removed when the image is viewed from a target view 108. The disocclusions 110 may cause holes 204 in a video frame 202 as shown in FIG. 2A. To make the target view 108 look natural, hole-filling methods are designed to recover such disocclusions 110. According to the processing domain, hole-filling methods are classified into spatial domain filling and temporal domain filling as illustrated in FIGS. 2B-D.

BACKGROUND OF THE INVENTION

Spatial filling methods, as illustrated in FIG. 2B try to guess the disoccluded texture according to various spatial correlation assumptions. Background textures are used to fill the disoccluded regions 110, as those regions normally hide in the reference view and contain further depth. One prior solution filled the disocclusions 110 with an average of the available background pixels in their neighborhood. However, the filling results tend to be over-smoothed when there are complex textures in the background. To overcome this over-smoothed artifact, classical spatial filling method such as exemplar based inpainting can be used. However, this approach performs worse in hole filling than in general images, because 1) the neighborhoods of the inpainting area are on the disparity boundaries, containing a lot of ambiguities, and 2) the texture to be inpainted is not constrained in the background. Other prior solutions extended traditional exemplar-based inpainting to depth-exemplar-based inpainting, where the depth is used to enforce the structure diffusion apart from texture diffusion. However, this approach is still far from real-time processing. In addition, the image quality of spatial domain filling methods depend on their spatial correlation assumptions.

Temporal domain filling methods may be more useful than special domain filling, considering it is able to reveal the ground-truth texture pattern in the disoccluded regions 110 by exploring more frames, while the spatial domain filling methods merely guess. FIG. 2C illustrates methods for filling using temporal past frames 206, and FIG. 2D illustrates methods for filing using both temporal past frames 206 and temporal future frames 208. One temporal solution used a running average background model in temporal domain by firstly segmenting background from the scene and then dynamically updating it. However, this approach may not work with slanted surfaces or non quasi-static background scenes. Another prior method filled the holes 204 by the background extracted from median filtering of the frames in the background layer. However, suitable background information is limited in the neighboring temporal segment. It was also an off-line process with relatively high memory occupation.

BRIEF SUMMARY OF THE INVENTION

Embodiments of apparatuses, systems, and methods for a temporal hole filling are described. Specifically, an embodiment of the present invention may include a depth-based hole filling process that includes a background modeling technique (SGM). Beneficially, in such an embodiment, holes in the synthesized view may be filled effectively and efficiently.

Embodiments of a method are presented in which an input texture video from a certain camera position and viewing angle with corresponding input depth information (e.g., depth map or disparity with respect to a rectified view from a different camera position/viewing angle) are processed temporally to extract a background video of same spatial and temporal resolution as the input texture video.

If the spatial resolution of the input depth is different from that of the input texture video, the depth information may be resized so that the spatial resolution is the same as that of the texture video. In particular, the resizing can be up-sizing or down-sizing. Up-sizing can be achieved by zero-order-hold, first-order-hold, high-order-hold polynomial fitting such as bi-cubic, or other methods. Down-sampling can be simple down-sampling with or without pre-filtering.

In some embodiments, each pixel of the background video is modeled as a single switchable distribution function (SSDF) with certain distribution parameters, for example the distribution function can be Gaussian, generalized Gaussian, Laplacian, Rayleigh, etc.

The first frame of the input texture video may be assumed to be background and is used to initialize the pixel-wise SSDF for every pixel of the background video. For each subsequent frame there may be a current background SSDF for each pixel.

The background SSDF for each pixel is updated at selected time instance. For example, a different pixel can have different updating time instance. The updating time can be regular or irregular. For regular updating the updating can happen once every T frames. The T can be different for different pixels. For the case when T is identical for some pixels, there can still be a phase shift in their updating time instance.

There may be three kinds of updating: (1) refinement (small change), (2) switching (relatively big change) and (3) null (no change). Different pixels can undergo different updating at their updating time instance.

In one embodiment, a potential-background buffer is established for each pixel to hold N sets of potential background texture values and depth map values from the past. The buffer may be initialized to be empty at the beginning. When the pixel undergoes null updating, the corresponding set of input pixel values (texture values and depth value) may be tested and added to the buffer if it is considered as potential background according to a predetermined threshold. In response to a pixel undergoing switching updating, the buffer may be reset to empty immediately after the switching updating. When a pixel undergoes refinement updating, the buffer may not change.

For each pixel, its input pixel values (i.e. input texture values and its depth value) are checked at the updating time instance according to its current background SSDF. If it matches the current background SSDF according to a second threshold, it is considered background and refinement updating is preformed. In other words, being the latest background value, it is used to update the background SSDF of the pixel. If it does not match the current background SSDF, it is checked further for similarity to the past potential background values stored in the buffer. If the number of similar past potential background values are large enough according to a third threshold, switching updating is performed by computing and switching to a new background SSDF based on these similar potential background values and the current input values. Otherwise, null switching is performed.

Hole filling may be accomplished by the modeled background video in the virtual view. To obtain the background video in the virtual view the input of background SSDF can be the texture video together with the corresponding depth information of the reference view, and subsequently synthesizes the background texture video and depth information to the virtual view at a different angle. Alternatively, the input of background SSDF can be the texture video together with the corresponding depth information of the virtual view. The above mentioned virtual texture video and depth information are synthesized from a single (or multiple) corresponding time-sequence of a reference view(s) at a different viewing angle(s). In one embodiment, a double-check method based on the depth component may be applied to reject outliers in the hole region.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Background modeling based on sole texture image is not robust to complex scene texture and scene changes. On the other hand, depth map provides an important clue for background detection because of its texture and illumination invariant feature. However, sole depth map based background modeling is insufficient, given the fact that depth map typically contains errors even with state-of-the-art depth estimation algorithms or capturing devices. According to one embodiment, both depth map and texture image may be used to build a background model to achieve both high accuracy and efficiency. The modeling system is designed according to the probability analysis—the probability of correctly detecting background pixels in the temporal domain.

Figure 1:
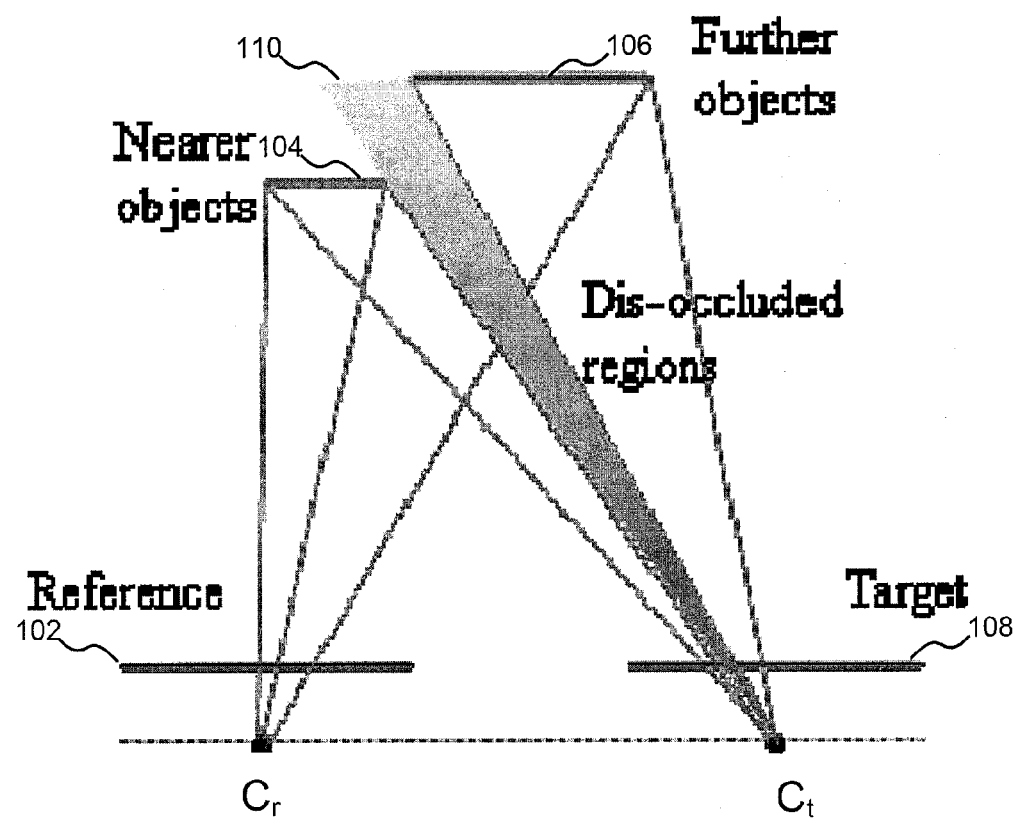
FIG. 1 is a schematic diagram illustrating one embodiment of an image viewing scenario in which disoccluded regions occur.
Figure 2A:
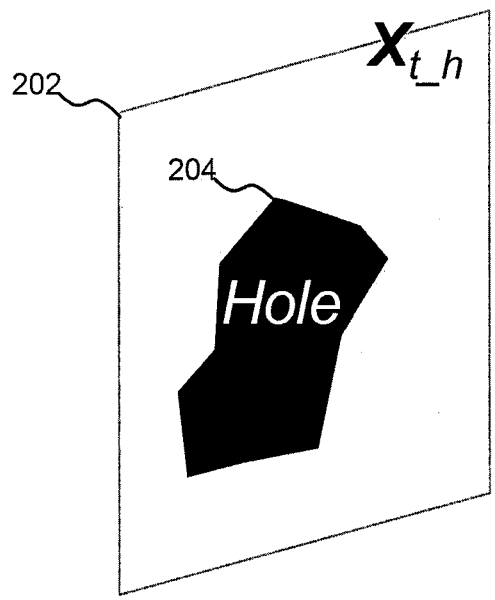
FIG. 2A illustrates an image having at least one hole caused by a disoccluded region.
Figure 2B:
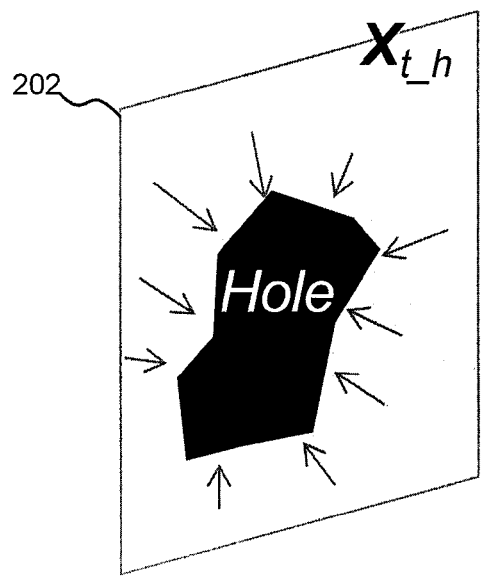
FIG. 2B illustrates a method for spatial filling of the hole.
Figure 2C:
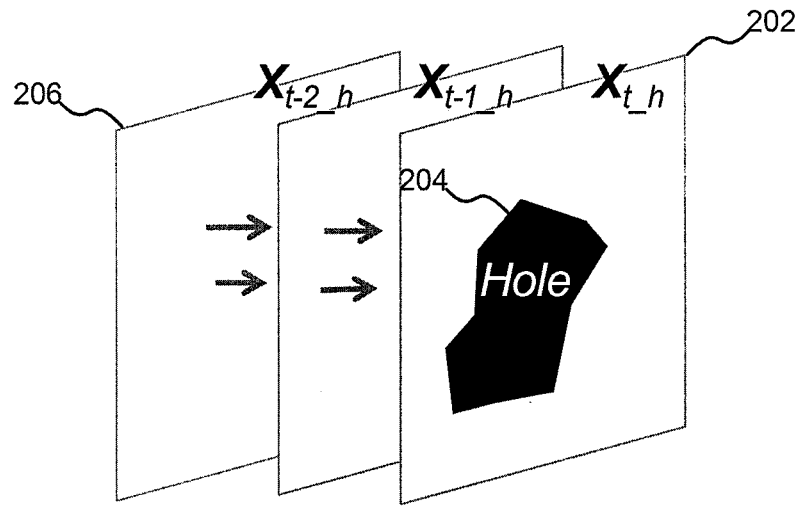
FIG. 2C illustrates a method for temporal filling of the hole using past frames.
Figure 2D:
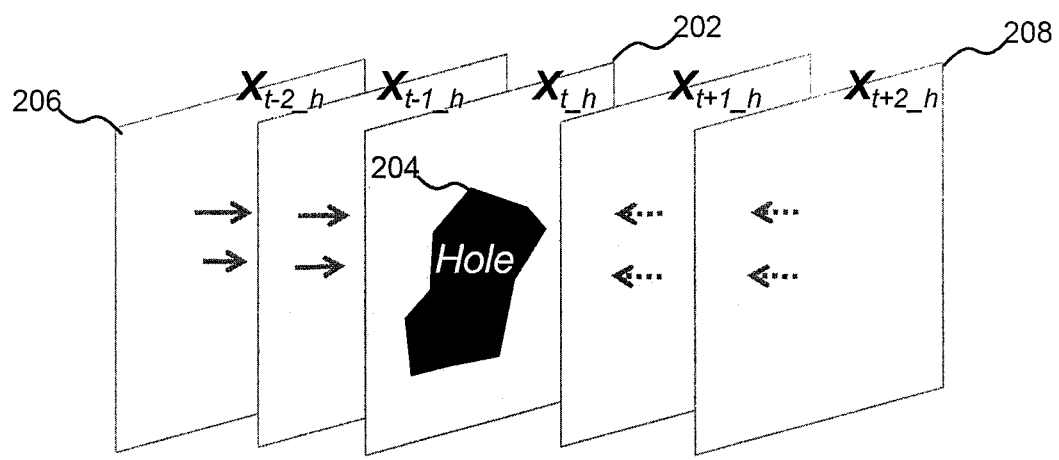
FIG. 2D illustrates a method for temporal filling of the hole using past and/or future frames.
Figure 3:
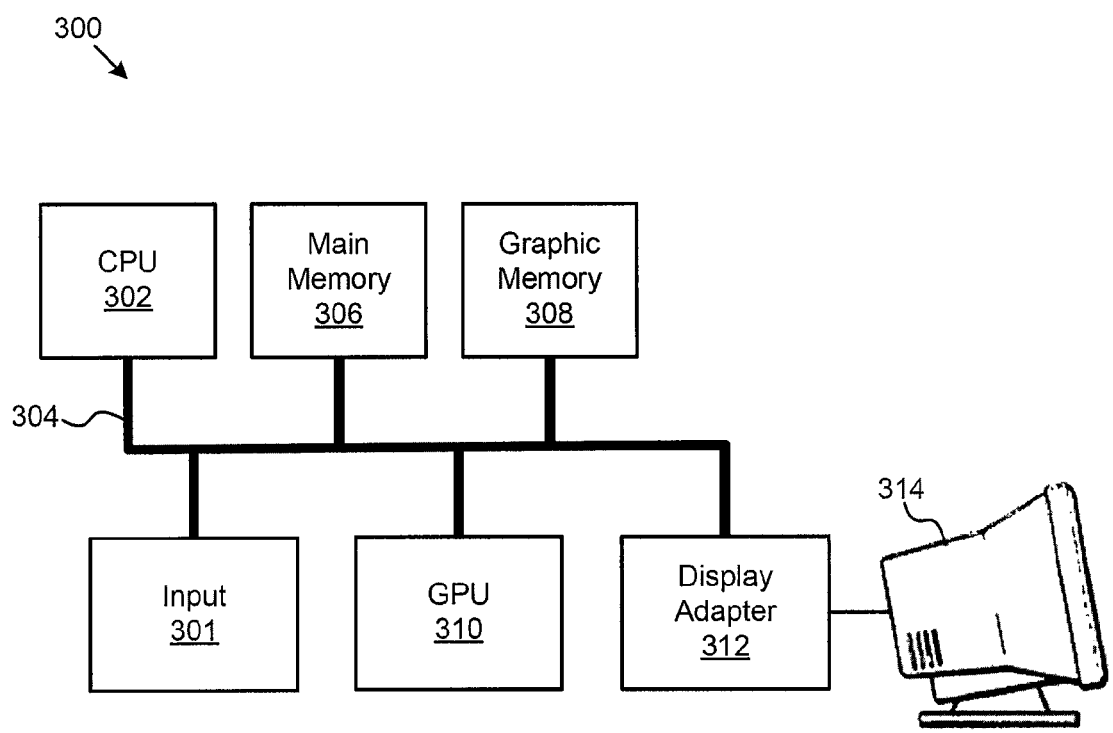
FIG. 3 illustrates one embodiment of a system that may be suitably configured for temporal domain hole filling based on background modeling for view synthesis.

FIG. 3 illustrates one embodiment of system 300 that may be suitably configured for temporal domain hole filling based on background modeling for view synthesis. In one embodiment, system 300 includes Central Processing Unit 306 (CPU), main memory device 306, graphic memory device 308, and Graphics Processing Unit 310 (GPU). These components may be coupled to input 301 and display adapter 312 by bus 304 or other suitable data connection. In a further embodiment, display adapter 312 may be configured to cause an output video to be displayed on display device 314. One of ordinary skill in the art will recognize a variety of device configurations of system 300 that may be suitably adapted for use with the present embodiments. In one embodiment computer readable instructions, comprising computer code may be stored in main memory 306 and executed by CPU 302 to cause CPU 302 to perform operations of the methods for temporal domain hole filling based on background modeling for view synthesis as described herein. Alternatively, the code may be stored in graphics memory 308 and executed by GPU 310. In a further embodiment, graphics memory 308 and GPU 310 may be integrated on a video or graphics card.

Figure 4:
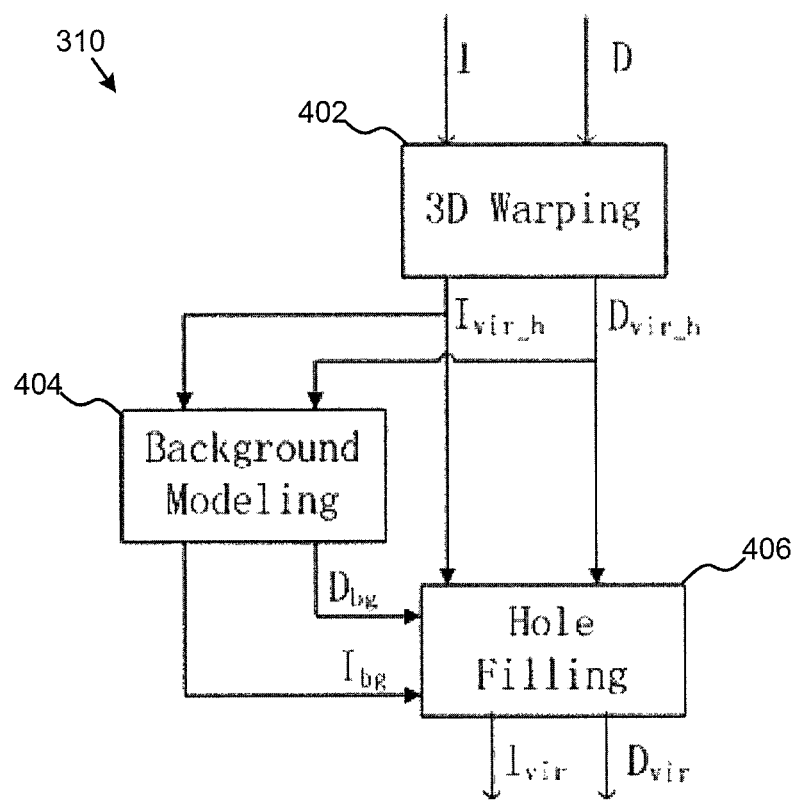
FIG. 4 illustrates one embodiment of a Graphics Processing Unit configuration for temporal domain hole filling based on background modeling for view synthesis.

FIG. 4 illustrates various modules that may be implemented in, e.g., GPU 310. In one embodiment, GPU 310 may be configured to include 3D warping module 402, background modeling module 404, and hole filling module 406. These modules may be software defined modules. Alternatively, these modules may be implemented in hardware using, e.g., an Application-Specific Integrated Circuit (ASIC).

3D warping module 402 may receive image texture information ('I') and depth information ('D') associated with a pixel. In one embodiment, the depth information may comprise a portion of a depth map. 3D warping module may then perform one of a variety of known image warping techniques to generate image texture information ('$I_{vir\_h}$') and depth information ('$D_{vir\_h}$') from target view 108. In various embodiments target view 108 may be a virtual view of the frame. $I_{vir\_h}$ and $D_{vir\_h}$ may include some holes.

Background modeling module 404 may then use $I_{vir\_h}$ and $D_{vir\_h}$ to generate and update a background model. The background model may include an SGM based on both the image data and the depth data ($I_{vir\_h}$ and $D_{vir\_h}$). Further embodiments of background modeling module 404 are described below with reference to FIGS. 6-7.

Figure 5:
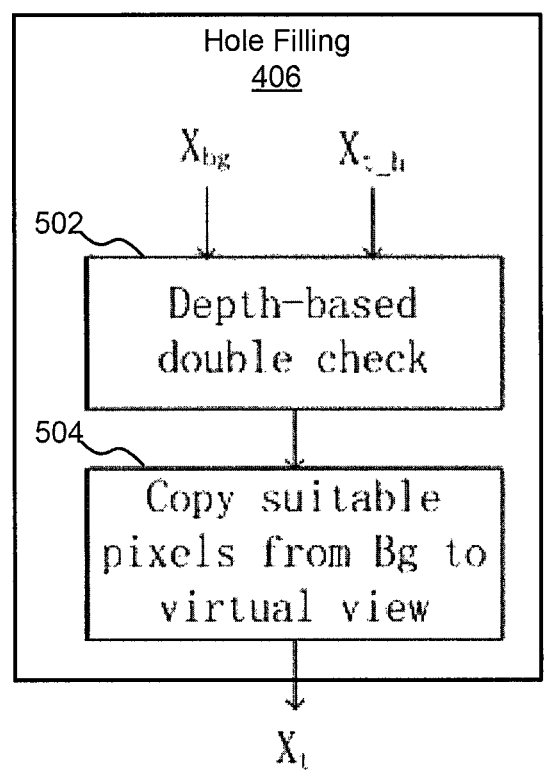
FIG. 5 illustrates one embodiment of a hole filling module configured according to one embodiment of a method for temporal domain hole filling based on background modeling for view synthesis.

Hole filling module 406 may then use the background image data ('$I_{bg}$') and the background depth data ('$D_{bg}$') to fill holes in the frame as represented by $I_{vir\_h}$ and $D_{vir\_h}$. For example, as illustrated in FIG. 5, hole filling module 406 may be configured to perform a depth-based double-check of the output of 3D warping module 402 and the output of background modeling module 404 at block 502. Additionally, hole filling module 406 may be configured to copy suitable pixels from the background model to the virtual view at block 504 to generate output $X_t$. Hole filling module 406 may perform the double check to avoid including modeling errors in the output. For example, not all pixels in the background model may be suitable for hole filling. The double check may reject outliers in hole region 204. Suitable pixels, however, may be identified and copied from the background model to the co-located position in target view 108 to file holes 204.

Figure 6:
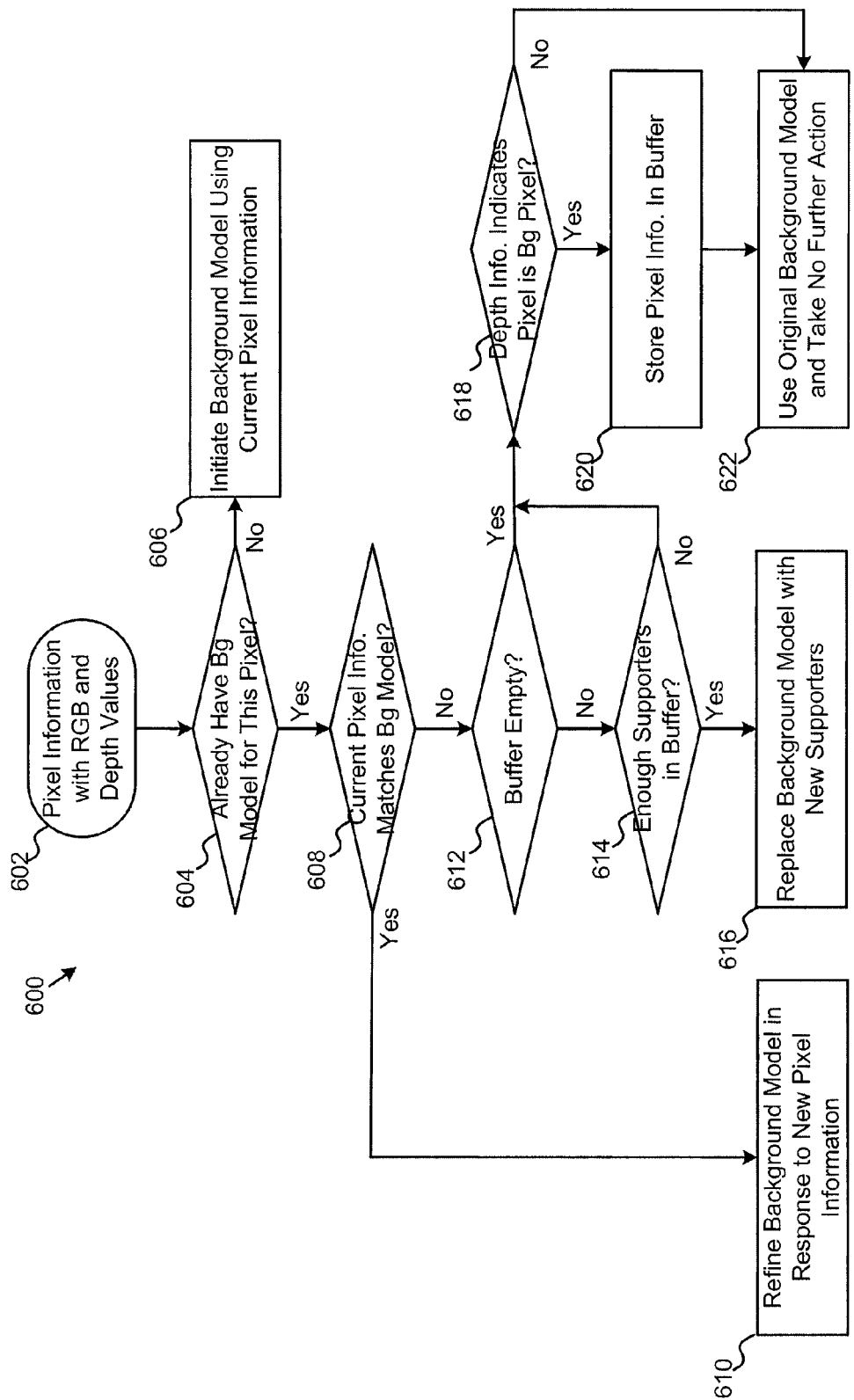
FIG. 6 is a schematic flowchart diagram illustrating one embodiment of a method for temporal domain hole filling based on background modeling for view synthesis.

FIG. 6 illustrates one embodiment of method 600 for generating and updating a background model. In one embodiment, 3D warping module 402 may provide pixel information, including for example, RGB and depth values, to background modeling module 404 as shown at block 602. Background modeling module 404 may then determine at block 604 whether a background model already exists for this pixel. If not, then background modeling module 404 initiates a background model using the current pixel information as shown at block 606. If a background model already exists, then the background module may determine at block 608 whether the current pixel information matches the background model information within a threshold value. If so, the background model may be refined in response to the current pixel information at block 610. Refining may include relatively small changes or updates to the existing model, such as changes in lighting and the like.

If the current pixel information does not match the background model to within a threshold value at block 608, then the background modeling module 404 may determine whether a buffer of supporter values is empty at block 612. If the buffer is not empty, then a further determination is made at block 614 of whether enough supporters are in the buffer to replace background model pixel with the new supporters at block 616.

If either the buffer is empty at block 612 or not enough supporters are stored in the buffer at block 614, then the background model module 404 checks to see if the depth information indicates that the pixel is a potential background pixel at block 618. If so, the pixel may be stored in the buffer at block 620. If the pixel is not a background pixel, then the original background model is used as shown in block 622. Similarly, once the pixel information is stored in the buffer at block 620, then the original background model is used as shown in block 622.

Figure 7:
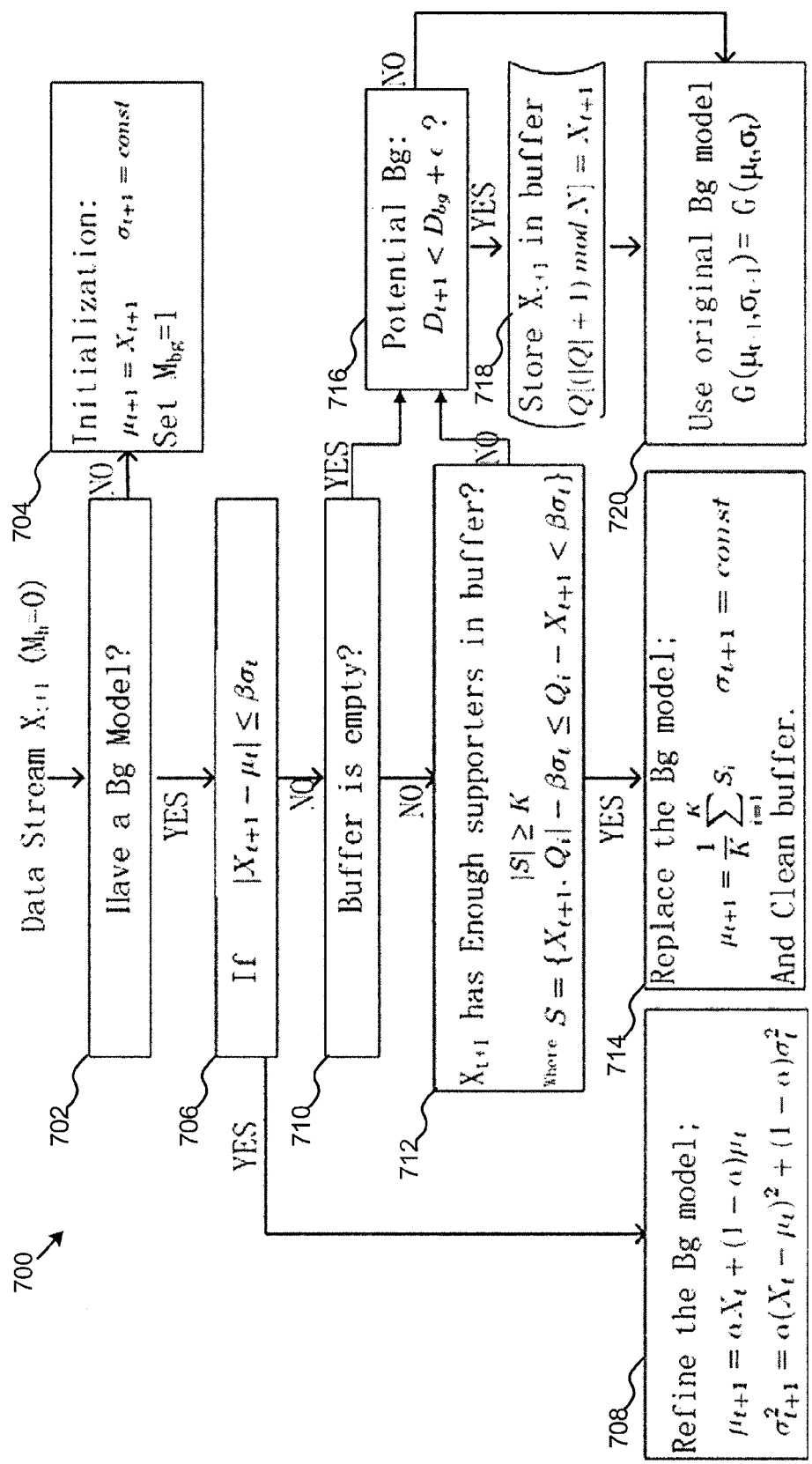
FIG. 7 is a schematic flowchart diagram illustrating one embodiment of mathematical criteria and operations for temporal domain hole filling based on background modeling for view synthesis.

FIG. 7 illustrates a further embodiment of the method 700 for generating and updating the background model. In this embodiment a data stream is received, which includes both image and depth information corresponding to a pixel. At block 702, the background model module 404 checks to see if a background model exists. If not, an initialization process as described in block 704 is started. If so, then a check at block 706 is performed to determine whether the absolute value of a difference between the pixel's image and depth information and a mean value of the background model for the pixel is greater than a threshold value corresponding to a product of the variance value of the background model for the pixel and a constant threshold value. If so, the background model may be refined by making updates to the mean and variance values for the pixel as shown in block 708. If not, a check is performed to see if the buffer is empty as shown in block 710. If not, a check is performed to see whether a minimum number of supporters are present in the buffer as shown in block 712. The minimum value may be set by constant K. If so, then the background model may be replaced as shown in block 714. If not, or if the buffer is empty, then a determination is made at block 716 to see whether a difference between the depth of the current pixel and the depth of the background model is less than a threshold value. If so, then the pixel information is stored in the buffer as shown in block 718. In either case, the original background model is used as shown in block 720. In a particular embodiment, the original background model comprises a SGM characterized by a Gaussian function as shown in block 720.

The following paragraphs describe further detailed embodiments of the methods described in relation to FIGS. 6 and 7. Assuming a background (short for BG) frame [$T_{bg}$, $D_{bg}$] is maintained and updated each time, where $T_{bg}$ and $D_{bg}$ denote the texture image and depth map respectively. To check the BG validity and make suitable update decisions, BG frame is stored in the memory buffer with N post frames [$T_1; D_1$], [$T_2; D_2$], : : : , [$T_N; D_N$]. In the following contents, one arbitrary pixel located at position (x, y) may be focused upon, exploring the temporal behavior without considering the correlations in the spatial domain. A concise notation [$t_i$, $d_i$] is used in short of [$T_i(x; y); D_i(x; y)$] for ease of presentation. Define an element $e_i$ as a vector $e_1 = [t_i, d_i]$ for the pixel in frame i. In the image location (x,y), there are N+1 elements stored in the memory for further consideration.

Primary Classification:

Given the fact that background object has further depth than the foreground object, a coarse detection of background elements is performed by comparing the depth component $d_i$ of each element $e_i$ with the BG depth component $d_{bg}$.

$$d_i \in \begin{cases} L_{bg} & \text{if } |d_i - d_{bf}| \leq \epsilon_d, \\ L_{far} & \text{if } d_i < d_{bg} - \epsilon_d, \\ L_{near} & \text{if } d_i > d_{bg} - \epsilon_d \end{cases} \quad (1)$$

Three sets $L_{bg}$, $L_{far}$, $L_{near}$ may be obtained, which contain elements with depth component similar to, deeper than, shallower than $d_{bg}$ (the depth of BG element), respectively. Elements in $L_{bg}$ and $L_{far}$ are considered to be potential background pixels. Please note that the $e_{bg}$ itself belongs to $L_{bg}$. Recall that depth map contains errors, background updating decisions will be made only after checking the texture color information of these elements.

Assistant Classification:

Two potential background sets are further classified into several subsets {$S_1, S_2, \ldots, S_q$} based on their color distributions, where:

$$S_1 \cup S_2 \cup \ldots \cup S_p = L_{bg}, S_{p+1} \cup \ldots \cup S_q = L_{far}, S_i \cap S_j = \emptyset$$
$$(i \neq j, 1 \leq i, j \leq q).$$

In one embodiment, it may be assumed that those collections within the same depth level are either all inliers or all outliers if they have consistent texture color.

According to the assumption, each subset $S_i$, (i=1 ... q), contains all inlier or outlier elements. Denote the number of elements in the target subset $S_i$ to be $n_{S_i}$. Assuming that the probability of estimating correct depth is independent and identically distributed (i.i.d.) in the temporal domain, and denote this probability asp. Then the probability of all entries in the subset $S_i$ to be inliers is calculated in Eqn. 2, given the fact that all entries are either all inliers or all outliers.

$$P(n_{S_i}, p) = \frac{p^{n_{S_i}}}{p^{n_{S_i}} + (1-p)^{n_{S_i}}} = \frac{1}{1 + \left(\frac{1}{p} - 1\right)^{n_{S_i}}} \qquad (2)$$

The probability $P(n_{S_i},p)$ monotonically increases with $n_{S_i}$ when p>0.5. If the probability larger than η is desired, the minimum size of subset $S_i$ is determined by $$n_{S_i} > \frac{\log(1/\eta - 1)}{\log(1/p - 1)} \qquad (3)$$

In one embedment, the probability $P(n_{S_i},p)$ of correct background detection may only depend on the size of set Si, but not the size of memory buffer N+1. This feature benefits the flexibility of the memory allocation, as it is not necessary to store all N+1 elements. Rather than choosing the most possible background elements from N+1 elements, the incoming element may be put into its corresponding set immediately according to its depth and texture value. Once the subset with largest accuracy probability reaches the predefined criterion, the background model is updated and the memory is emptied for future data. The criterion is defined as $n_{S_i}=2$ when p=0.8, for fast computation (only two elements are needed) and accurate modeling (P=0.9412). In one embodiment, $n_{S_i}$ is identical to K as shown in block 712.

In order to maintain the BG frame and decide the adaptive threshold in the classification process in Eqn. 1, a background model is required. Different from Gaussian Mixture Model (GMM), an elegant and concise Switchable Gaussian Model (SGM) is designed, because of the low computation complexity requirement in view synthesis and the fact that only the most probable candidate is needed to fill holes. In this model, only a single Gaussian G(μ, σ) may be used, but it will switch to a new Gaussian when some unfit data appears.

When the new potential background data set $S_i$ is obtained, it can be checked to determine whether it fits the current background model according to the existence of BG element in the set. The BG element inside the set means that the new data support the current background model. In this situation, the background model is refined to accommodate to the scene changes. On the contrary, if the BG element is outside the set, the current model might be wrong, because it is not supported by the new potential background data. Therefore, in order to quickly correct the background model errors, the current model is switched to a new background model containing the characteristics of the new data.

Formally, the model in one pixel location is initialized and updated as described in the following contents.

Initialization:

Because the errors in the background model G(μ, σ) are able to be quickly corrected in the switch mode, the mean of Gaussian is initialized as the value in the first frame and the variance is initialized as a constant.

$$\mu_{t|t=1}=e_1, \sigma_{t|t=1}=\text{const} \qquad (4)$$

where μ is a 2×1 vector containing the mean of texture color and depth value, similarly with the variance vector σ. All the subscriptions indicate the frame number.

Refine Mode:

In the refine mode, both two parameters in the Gaussian model need to be updated with a learning rate α. The learning rate α guides the adaptation speed. New data would integrate into the background more quickly when the learning rate is large.

$$\mu_{t+1}=\alpha e_t + (1-\alpha)\mu_t$$
$$\sigma_{t+1}^2=\alpha(e_t-\mu_t)^2+(1-\alpha)\sigma_t^2 \qquad (5)$$

Switch Mode:

In the switch mode, the mean of Gaussian is replaced with the mean of elements $\mu_s$ in the subset, and the variance of Gaussian is replaced with a constant.

$$\mu_{t+1}=\mu_s, \sigma_{t+1}=\text{const} \qquad (6)$$

The inputs of the background modeling system are warped texture and warped depth. The mask of available pixels is denoted as $M_t^w$, where the superscript stands for 'warp' and the subscript denotes the frame. Since the original data is not complete, the built background is not complete in the first few frames. The mask $M_t^b$ is used to denote the pixel availability in the background model for frame t.

Foreground pixels would mistakenly exist in the background model if all available previous frames of this location are occupied by foreground objects. In order to reject the inaccurate modeling, an indication of the appropriate depth in the hole regions may be useful. The Joint Projection Filtering (JPF) fills the disocclusions of depth map during warping based on the ordered rendering technique, where holes are ensured to be filled by background. Denote the completed depth map as $D'_t$ for frame t. The suitable background pixels are indicated by comparing the depth of background model and the completed depth of the current frame. A bool map $M_t^s$ is used to denote this suitability.

$$M_t^s(x, y) = \begin{cases} 1, & \text{if } |D_{bg}(x, y) - D'_t(x, y)| < \varepsilon \\ 0, & \text{otherwise} \end{cases} \qquad (7)$$

where ε is the allowed depth prediction error. Finally, the region to be filled by background model in frame t is $M_t^{tp}=M_t^b \cap (1-M_t^w) \cap M_t^s$, where the superscript tp stands for temporal. For those regions marked as 1 in $M_t^{tp}$, the texture and depth value are filled by the mean of background model:

$$T_t(x,y)=\mu_t^T(x,y) D_t(x,y)=\mu_t^D(x,y), \text{if } M_t^{tp}(x,y)=1 \qquad (8)$$

where $\mu_t^T$, $\mu_t^D$ is the mean map of frame t in the Gaussian model of texture and depth respectively. The rest holes to which temporal filling is not applicable are filled by conventional spatial hole-filling methods.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for temporal domain hole filling based on background modeling for view synthesis comprising:
receiving texture information associated with a plurality of pixels in a video frame;
receiving depth information associated with the plurality of pixels in the video frame;
determining whether an update to a background model associated with the video frame is required in response to the texture information and the depth information associated with each of the plurality of pixels in the video frame;
updating the background model in response to the texture information and the depth information, wherein the updating the background model comprises:
storing texture and depth values of a current pixel in the plurality of pixels in a buffer of supporter values in response to a determination that a difference in depth between the current pixel in the plurality of pixels and a corresponding pixel in the background model exceeds a first threshold value; and
replacing the background model with a new background model in response to a determination that a difference between the texture and depth information of the current pixel in the plurality of pixels and the corresponding pixel in the background model exceeds a second threshold value, and in response to a determination that a threshold number of supporter values have been identified in the buffer of supporter values; and
filling holes in a background of a synthesized virtual view of the video frame using texture information and depth information from the background model for each of the plurality of pixels in the video frame, wherein the filling holes comprises copying at least one suitable pixel from the background model to the background of the synthesized virtual view, wherein the holes are caused by a disocclusion in the video frame.

2. The method of claim 1, further comprising initiating a new background model in response to a determination that a background model does not exist for a pixel in the plurality of pixels.

3. The method of claim 1, wherein updating the background model comprises refining a pixel in the background model in response to the texture information and the depth information.

4. The method of claim 1, wherein each pixel of the background model comprises a Single Switchable Distribution Function (SSDF).

5. The method of claim 4, wherein the SSDF is a Gaussian function.

6. The method of claim 1, wherein updating the background model comprises switching from a first distribution function associated with a pixel in the background model to a second distribution function associated with a set of supporter values.

7. The method of claim 1, further comprising automatically extracting background video from the background model.

8. The method of claim 1, further comprising receiving the texture information and the depth information from a reference view of the video frame.

9. The method of claim 1, further comprising receiving the texture information and the depth information from a target view of the video frame, the target view having a same viewpoint angle as the synthesized virtual view of the video frame.

10. A system for temporal domain hole filling based on background modeling for view synthesis comprising:
an input device configured to receive texture information and depth information associated with a plurality of pixels in a video frame;
a processor coupled to the input device, the processor configured to:
determine whether an update to a background model associated with the video frame is required in response to the texture information and the depth information associated with each of the plurality of pixels in the video frame;
update the background model in response to the texture information and the depth information, wherein the background model is updated by:
a buffer of supporter values configured to store texture and depth values of a current pixel in the plurality of pixels in response to a determination that a difference in depth between the current pixel and a corresponding pixel in the background model exceeds a threshold value; and
configuring the processor to replace the background model with a new background model in response to a determination that a difference between the texture and depth information of the current pixel in the plurality of pixels and the corresponding pixel in the background model exceeds a second threshold value, and in response to a determination that a threshold number of supporter values have been identified in the buffer of supporter values; and
fill holes in a background of a synthesized virtual view of the video frame using texture information and depth information from the background model for each of the plurality of pixels in the video frame, wherein the filling of holes comprises copying at least one suitable pixel from the background model to the background of the synthesized virtual view, wherein the holes are caused by a disocclusion in the video frame.

11. The system of claim 10, wherein the processor is configured to initiate a new background model in response to a determination that a background model does not exist for a pixel in the plurality of pixels.

12. The system of claim 10, wherein the processor is further configured to refine a pixel in the background model in response to the texture information and the depth information.

13. The system of claim 10, wherein each pixel of the background model comprises a Single Switchable Distribution Function (SSDF).

14. The system of claim 13, wherein the SSDF is a Gaussian function.

15. The method of claim 10, wherein the processor is further configured to switch from a first distribution function associated with a pixel in the background model to a second distribution function associated with a set of supporter values.

16. The system of claim 10, wherein the processor is further configured to automatically extract background video from the background model.

17. The system of claim 10, wherein the input device is further configured to receive the texture information and the depth information from a reference view of the video frame.

18. The system of claim 10, wherein the input device is further configured to the texture information and the depth information from a target view of the video frame, the target view having a same viewpoint angle as the synthesized virtual view of the video frame.

\* \* \* \* \*

UNITED STATES PATENT AND TRADEMARK OFFICE
CERTIFICATE OF CORRECTION

PATENT NO. : 9,235,879 B2
APPLICATION NO. : 13/538966
DATED : January 12, 2016
INVENTOR(S) : Sun Wenxiu et al.

It is certified that error appears in the above-identified patent and that said Letters Patent is hereby corrected as shown below:

In the Specification:

At column 6, line number 35, delete "$e_1=[t_1, d_1]$" and replace with -- $e_l=[t_l, d_l]$ --.

At column 7, line number 6, delete "asp" and replace with -- as $p$ --.

In the Claims:

At column 10, line number 56, claim 15, delete "method" and replace with -- system --.

Signed and Sealed this
Seventeenth Day of May, 2016

Michelle K. Lee
*Director of the United States Patent and Trademark Office*